US00RE50553E

(19) United States
(12) Reissued Patent
Kohl et al.

(10) Patent Number: US RE50,553 E
(45) Date of Reissued Patent: Aug. 26, 2025

(54) FOLDABLE HAND-HELD TOOL

(71) Applicant: HUSQVARNA AB, Huskvarna (SE)

(72) Inventors: Peter Kohl, Illertissen (DE); Patrick Missel, Westerstetten (DE); Bernhard Reh, Laichingen (DE)

(73) Assignee: HUSQVARNA AB, Huskvarna (SE)

(21) Appl. No.: 18/497,069

(22) Filed: Oct. 30, 2023

Related U.S. Patent Documents

Reissue of:

(64) Patent No.: 9,427,814
Issued: Aug. 30, 2016
Appl. No.: 14/778,267
PCT Filed: Mar. 19, 2013
PCT No.: PCT/EP2013/055638
§ 371 (c)(1),
(2) Date: Sep. 18, 2015
PCT Pub. No.: WO2014/146689
PCT Pub. Date: Sep. 25, 2014

(51) Int. Cl.

| | |
|---|---|
| ***B23D 51/01*** | (2006.01) |
| ***B26B 1/04*** | (2006.01) |
| ***B27B 21/00*** | (2006.01) |

(52) U.S. Cl.

CPC ..... *B23D 51/01* (2013.01); *B26B 1/044* (2013.01); *B26B 1/046* (2013.01); *B27B 21/00* (2013.01)

(58) Field of Classification Search
CPC ..... B27B 21/00; B23D 51/01; B26B 1/046
See application file for complete search history.

(56) References Cited

U.S. PATENT DOCUMENTS 2,621,689 A * 12/1952 Fordon ..... B23D 51/10 30/519
2,747,631 A * 5/1956 Behlefeldt ..... B23D 49/12 30/519

(Continued)

FOREIGN PATENT DOCUMENTS

DE 202008003622 U1 10/2008
WO 2001081052 A1 11/2001
WO WO-2010091284 A1 * 8/2010 ..... B23D 51/01

OTHER PUBLICATIONS

1998 Dealer Catalog, Gerber, Outdoor Recreational Products, Front cover.

(Continued)

*Primary Examiner* — Matthew J Kasztejna
(74) *Attorney, Agent, or Firm* — Burr & Forman

(57) ABSTRACT

A hand-held tool (100) includes a handle (104), and a blade (102) pivotably coupled to the handle at a proximal end (105). The blade includes a plurality of apertures (116, 118, 120, 122). The hand-held tool further includes a locking member (438) is configured to detachably engage with one of the plurality of the apertures to retain the blade at an angular position relative to the handle. The locking member is provided on a bracket member coupled to the handle, the bracket member being configured to at least partially enclose the proximal end of the blade. The bracket member is spring biased such that the locking member engages with one of the plurality of the apertures to retain the blade at an angular position relative to the handle. Further, the bracket member is movable such that the locking member disengages from one of the plurality of the apertures to allow the blade to pivot relative to the handle.

16 Claims, 9 Drawing Sheets

(56) References Cited

U.S. PATENT DOCUMENTS

| | | | | | |
|---|---|---|---|---|---|
| 3,851,986 | A * | 12/1974 | Daughtry | B26B 1/046 | 30/125 |
| 4,730,394 | A * | 3/1988 | Sonner, Jr. | B26B 1/048 | 30/155 |
| 5,722,168 | A * | 3/1998 | Huang | B23D 51/10 | 30/160 |
| 5,924,210 | A | 7/1999 | Hung | | |
| 5,930,902 | A * | 8/1999 | Hsu | B23D 51/01 | 30/166.3 |
| 5,979,065 | A * | 11/1999 | Hsu | B23D 51/01 | 30/519 |
| 6,253,455 | B1 | 7/2001 | Eriksson et al. | | |
| 8,707,564 | B2 * | 4/2014 | Burch | B23D 51/01 | 30/155 |
| 2006/0283021 | A1 * | 12/2006 | Chu | B26B 1/044 | 30/155 |
| 2007/0137047 | A1 | 6/2007 | Kim | | |
| 2012/0023753 | A1 * | 2/2012 | Wen | B26B 1/046 | 30/156 |
| 2016/0067803 | A1 * | 3/2016 | Kohl | B26B 1/044 | 30/161 |

OTHER PUBLICATIONS

1998 Dealer Catalog, Gerber, Outdoor Recreational Products, p. 12.
Gerber Exchange-A-Blade—Blade Change Demo, www.youtube.com/watch?v=q3B4zqSqj74, YouTube video, May 15, 2012.
International Search Report and Written Opinion in the International Application No. PCT/EP2013/055638 mailed Dec. 10, 2013.
International Preliminary Report on Patentability in the International Application No. PCT/EP2013/055638 issued Sep. 22, 2015.

* cited by examiner

FOLDABLE HAND-HELD TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a foldable hand-held tool.

BACKGROUND

Foldable hand-held tools, such as handsaws, are well known in the art. A foldable hand-held tool includes a handle and a blade pivotably coupled to the handle. The blade may be retained in multiple angular positions relative to the handle. Typically, a user may unlock the blade, rotate the blade to a desired angular position, and lock the blade in that position.

U.S. Pat. No. 5,924,210 granted on Jul. 20, 1999 discloses a saw including a handle and a saw blade pivotably coupled to the handle and having two or more orifices. The handle includes a spring-biased projection for engaging with the orifices and for securing the saw blade at a selected angular position relative to the blade. A knob is slidably engaged in the handle for disengaging the projection from the orifices and for allowing the saw blade to rotate relative to the handle. During adjustment of the saw blade, a force required to keep the projection disengaged may be quite high causing inconvenience to a user. Further, during operation of the saw, forces acting on the saw blade may be directly transferred to the projection. This may result in premature wear of the projection.

Therefore, in light of the foregoing, there is a need for an improved foldable hand-held tool.

SUMMARY

In view of the above, it is an objective of the present invention to solve or at least reduce the problems discussed above. The objective is at least partially achieved according to a hand-held tool, in an embodiment of the present invention. The hand-held tool includes a handle, and a blade pivotably coupled to the handle at a proximal end. The blade includes a plurality of apertures. The hand-held tool further includes a locking member that is configured to detachably engage with one of the plurality of the apertures to retain the blade at an angular position relative to the handle. The locking member is provided on a bracket member coupled to the handle, the bracket member being configured to at least partially enclose the proximal end of the blade. The bracket member is spring biased such that the locking member engages with one of the plurality of the apertures to retain the blade at an angular position relative to the handle. Further, the bracket member is movable such that the locking member disengages from one of the plurality of the apertures to allow the blade to pivot relative to the handle. During an operation, forces acting on the blade may be partly transmitted from the proximal end to various components of the hand-held tool in contact with the bracket member. Consequently, an area of dissipation of the forces is increased. Therefore, the forces may be dissipated without causing increased wear to the blade, the locking member, the bracket member, and/or various other components of the hand-held tool.

In an embodiment, the bracket member comprises two lateral portions, each lateral portion being connected to each other at one end. Further, the two lateral portions at least partially enclose the proximal end of the blade. The two lateral portions may increase a dissipation of forces from the blade to various components.

In an embodiment, the locking member is integral with the bracket member. In an alternative embodiment, the locking member is a pin coupled to one of the lateral portions. The bracket member may therefore prevent any undesired movement of the locking member.

In an embodiment, the bracket member further includes at least one first coupling portion, the at least first coupling portion configured to movably engage with a bracket support of the handle. In another embodiment, the bracket member further includes a second coupling portion, the second coupling portion being configured to engage with a connecting portion of the handle. The first and the second coupling portions may substantially prevent any rotational movement of the bracket member.

In an embodiment, a spring member is disposed between the bracket member and the handle. The spring member is configured to bias the bracket member such that the locking member engages with one of the plurality of the apertures.

In an embodiment, an actuating member is configured to move the bracket member such that the locking member disengages from one of the plurality of the apertures. In another embodiment, the actuating member at least partly projects from an outer surface of the handle. In a further embodiment, the actuating member includes an inner boundary and a central member, the inner boundary and/or the central member being configured to contact the bracket member. The inner boundary and/or the central member may increase an area of contact between the actuating member and the bracket member. Thus, a user may have to exert lower force in order to move the bracket member via the actuating member. Further, the actuating member may be conveniently actuated by a user since the actuating member at least partly projections from an outer surface of the handle.

In an embodiment, the plurality of the apertures of the blade includes at least one working position aperture corresponding to a working position of the blade, the blade extending from the handle in the working position; and a retracted position aperture corresponding to a retracted position of the blade, the blade at least partially retracted within the handle in the retracted position. Further, in another embodiment, the handle includes a slot configured to at least partially receive the blade in the retracted position.

In an embodiment, the blade further comprises a non-circular aperture, the non-circular aperture being configured to engage with a corresponding non-circular portion of a screw. The engagement of the non-circular aperture of the blade with the non-circular portion of the screw may prevent any relative rotational movement between the screw and the blade.

In an embodiment, the screw engages with a bushing, the screw and the bushing being rotatable relative to the handle. The screw and the bushing may facilitate a pivoting of the blade when the locking member is disengaged from one of the plurality of the apertures of the blade.

In an embodiment, the handle further comprises a detachable cover member. The detachable cover member may facilitate assembly and/or maintenance of the hand-held tool.

In an embodiment, the hand-held tool is one of a handsaw or a knife.

BRIEF DESCRIPTION OF THE DRAWINGS

The invention will be described in more detail with reference to the enclosed drawings, wherein.

DESCRIPTION OF EMBODIMENTS

Figure 1:
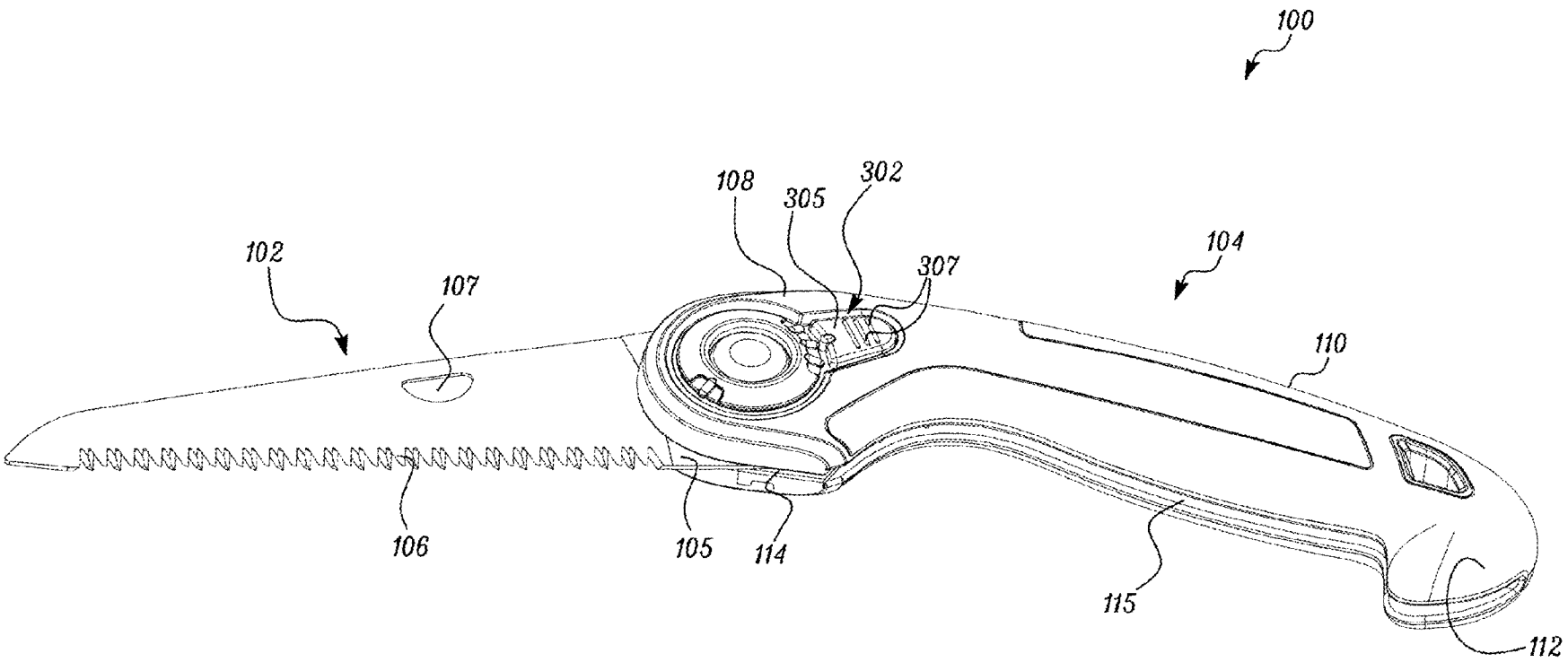
FIG. 1 illustrates a perspective view of a hand-held with a blade in a middle working position, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "lateral", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIGS. 1-9, illustrate various configurations of a hand-held tool 100 (hereinafter referred to as "the tool 100"), according to an embodiment of the present invention. The tool 100 is embodied as a handsaw in FIGS. 1-9. However, in various other embodiments, the tool 100 may be a knife. The tool 100 may be used for cutting various objects, for example, but not limited to, branches, logs etc.

The tool 100 includes a blade 102 and a handle 104. In an embodiment of the present invention, the blade 102 is pivotably coupled to the handle 104 at a proximal end 105 of the blade 102. The blade 102 includes a cutting edge 106 with serrations. Alternately, the cutting edge 106 may be smooth (not shown). The blade 102 further includes an eyelet 107 that may facilitate grasping of the blade 102 in order to pivot the blade 102 relative to the handle 104.

Figure 4:
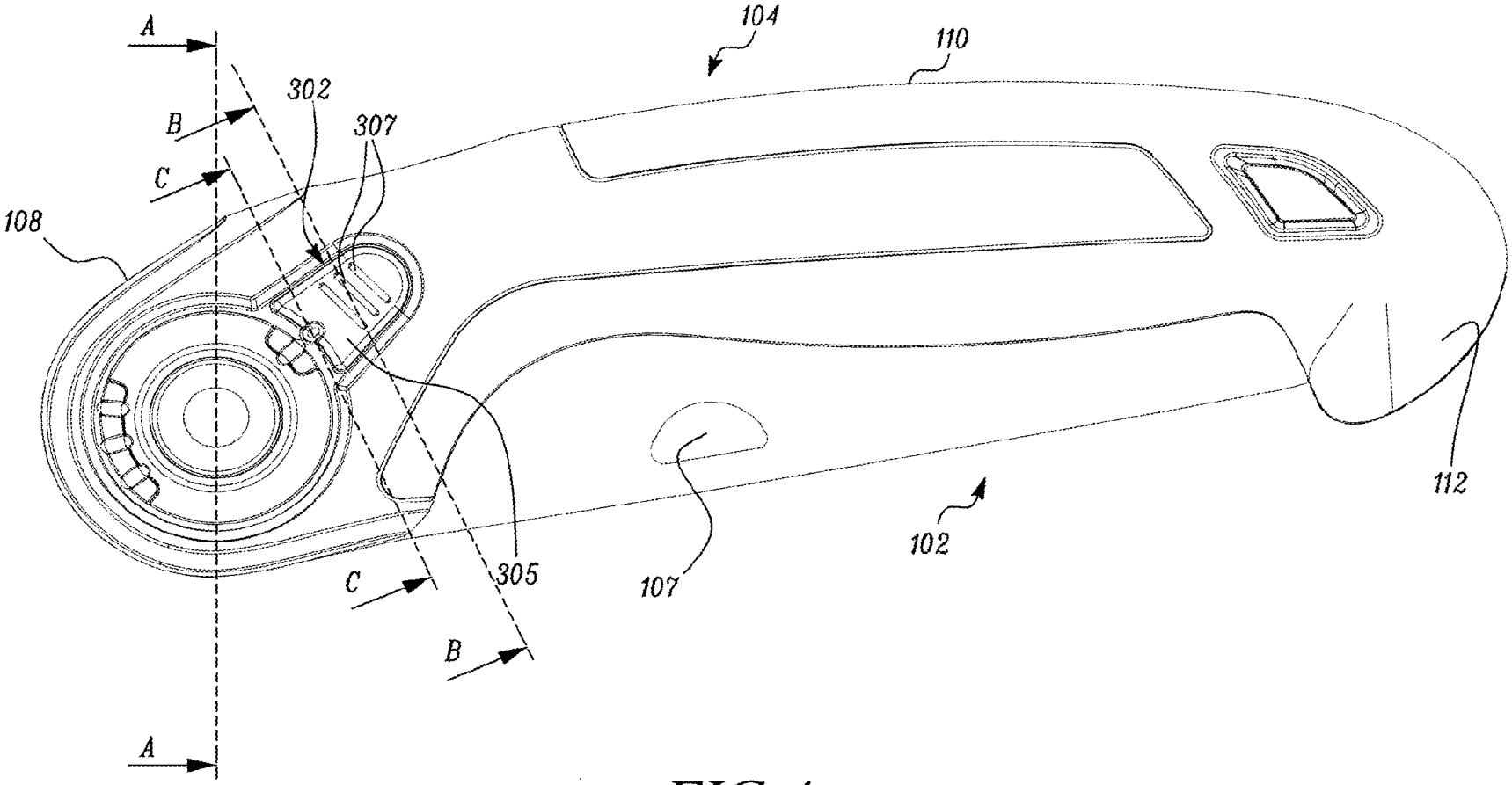
FIG. 4 illustrates a side view of the hand-held tool with the blade in a retracted position, according to the embodiment of FIG. 1.

The handle 104 includes a first portion 108 and a second portion 110. The proximal end 105 of the blade 102 is coupled with the first portion 108. The second portion 110 may be used for gripping by a user. The second portion 110 includes an end support 112 that may prevent a user's hand from slipping off the handle 104. The first portion 108 includes a first slot 114. The blade 102 extends from a portion of the first slot 114 disposed in the first portion 108. Further, the second portion 110 includes a second slot 115. In an embodiment, the first slot 114 and the second slot 115 may be continuous from the first portion 108 to the end support 112. Further, as illustrated in FIG. 4, the blade 102 at least partly retracts into a portion of the second slot 115. Further, the second portion 110 may include a grip (not shown) in order to facilitate grasping. In an embodiment, the handle 104 may be a single piece with a detachable cover (shown in FIG. 5) in the first portion 108. In an alternate embodiment, the handle 104 may include two halves that are joined together.

Figure 2:
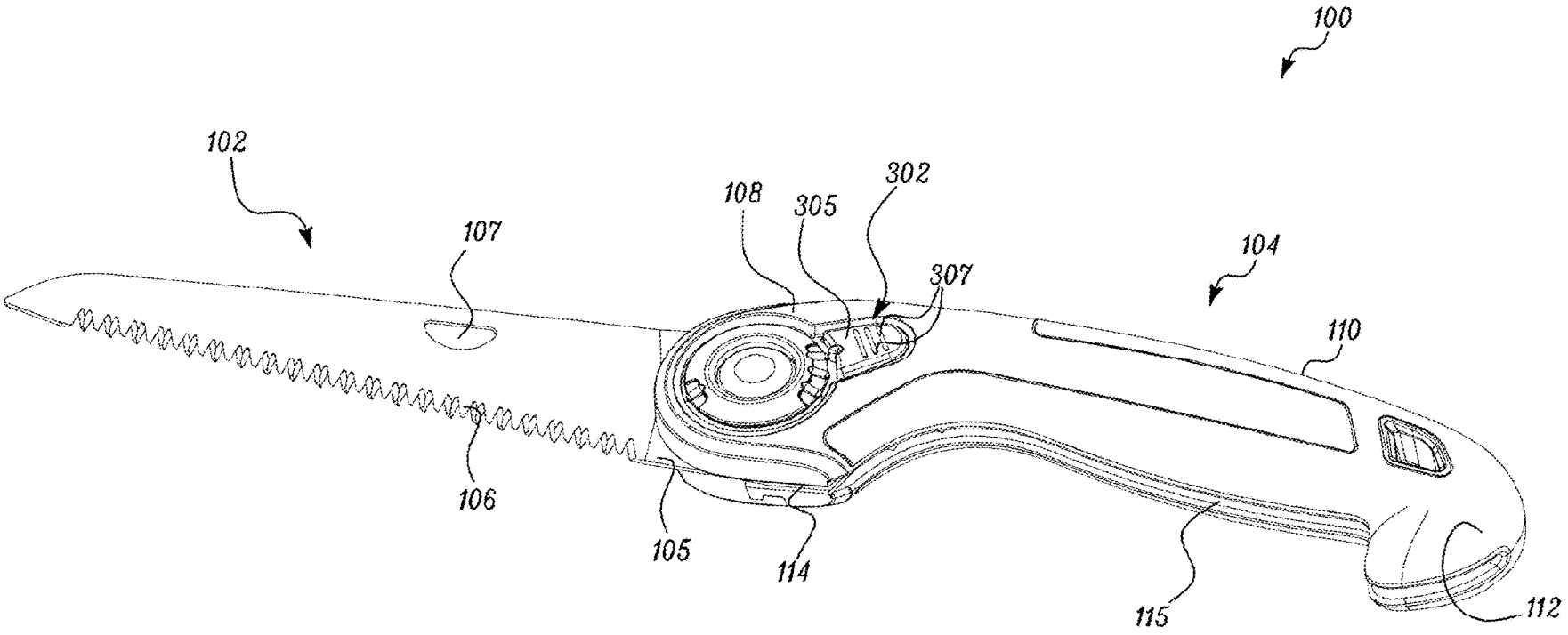
FIG. 2 illustrates a perspective view of the hand-held tool with the blade in an upper working position, according to the embodiment of FIG. 1.
Figure 3:
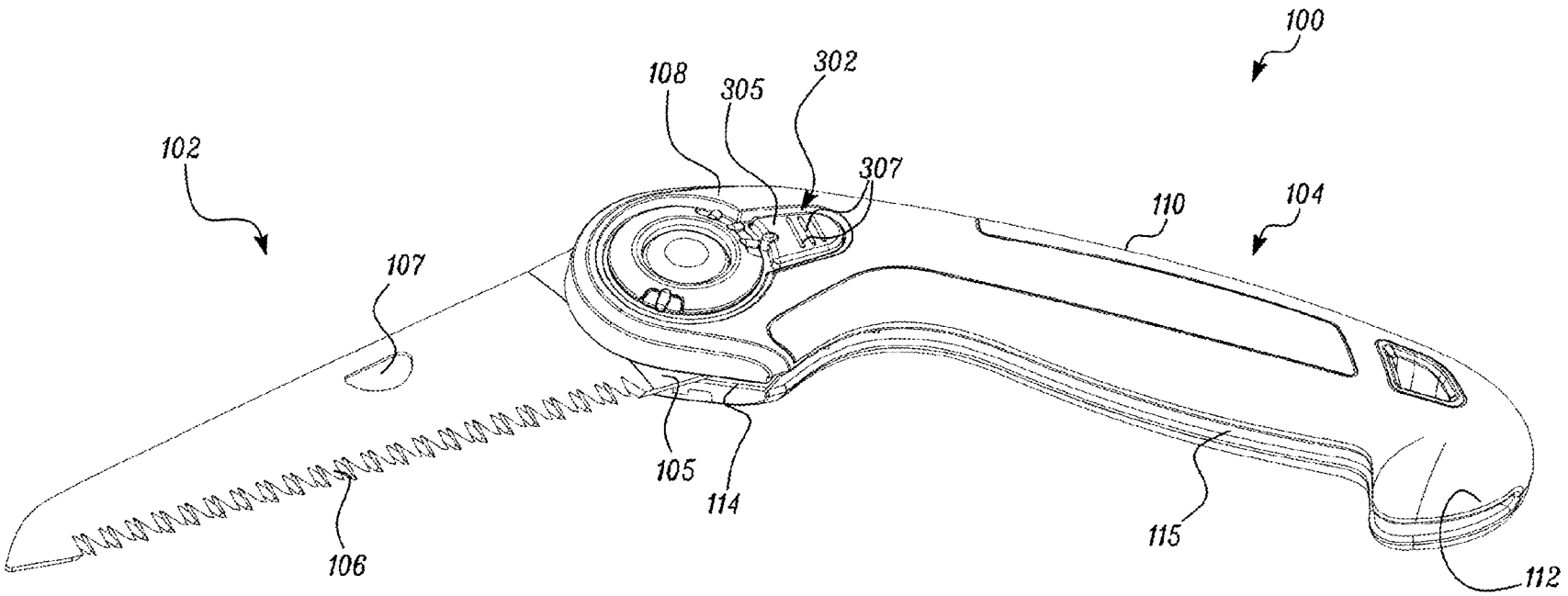
FIG. 3 illustrates a perspective view of the hand-held tool with the blade in a lower working position, according to the embodiment of FIG. 1.

In an embodiment, the blade 102 is retained at a plurality of angular positions relative to the handle 104. As illustrated in FIG. 1, the blade 102 is retained in a middle working position. In the middle working position, the blade 102 may extend from the handle 104 and is oriented substantially parallel relative to the first portion 108 of the handle 104. As illustrated in FIG. 2, the blade 102 is retained in an upper working position. In the upper working position, the blade 102 may be angled upwards relative to the first portion 108 of the handle 104. As illustrated in FIG. 3, the blade 102 is retained in a lower working position. In the lower working position, the blade 102 may be angled downwards relative to the first portion 108 of the handle 104. As illustrated in FIG. 4, the blade 102 is retained in a retracted position. In the retracted position, the blade 102 may be at least partially retracted within the second slot 115 (shown in FIG. 1) of the handle 104.

The various angular positions of the blade 102, as described above, are purely exemplary in nature, and the blade 102 may have any number and/or type of angular positions relative to the handle 104 within the scope of the present invention.

Figure 5:
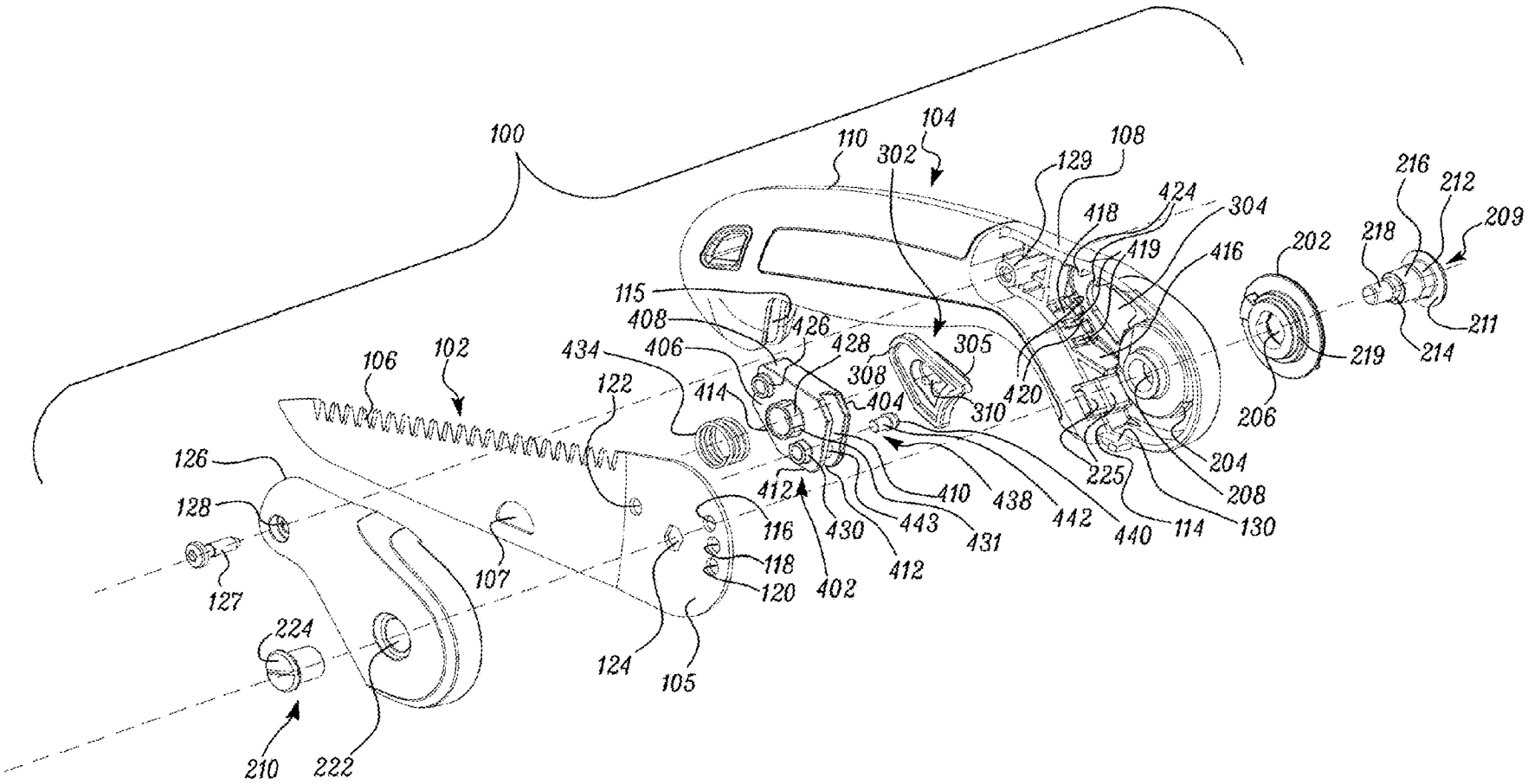
FIG. 5 illustrates an exploded view of the hand-held tool, according to an embodiment of the present invention.

FIG. 5 illustrates an exploded view of the tool, according to an embodiment of the present invention. The proximal end 105 of the blade 102 includes a lower working position aperture 116, a middle working position aperture 118, an upper working position aperture 120, a retracted position aperture 122, and a non-circular aperture 124 (hereinafter referred to as the apertures 116, 118, 120, 122 and 124). In an embodiment, the apertures 116, 118, 120 and 122 correspond to the lower working position, the middle working position, the upper working position, and the retracted position of the blade 102, respectively. Further, the apertures 116, 118, 120 and 122 are substantially circular. The blade 102 pivots about the aperture 124. The apertures 116, 118, 120, 122 and 124 are purely exemplary in nature, and the blade 102 may include any other type and/or number of apertures within the scope of the present invention.

The handle 104 includes a cover member 126 that is detachably coupled to the first portion 108 by a fastener 127. The fastener 127 passes through a hole 128 in the cover member 126 and is received by a cover coupler 129 of the first portion 108. Further, a latch 130 of the first portion 108 may detachably engage with a corresponding part (not shown) of the cover member 126. Alternatively, the cover member 126 may be attached to the first portion 108 by any other detachable means, such as, snap-fit couplings, or the like. The cover member 126 may enable easy assembly and also convenient access to the inner volume of the first portion 108. In an alternative embodiment, the handle 104 may include two halves that are joined together.

Figure 6:
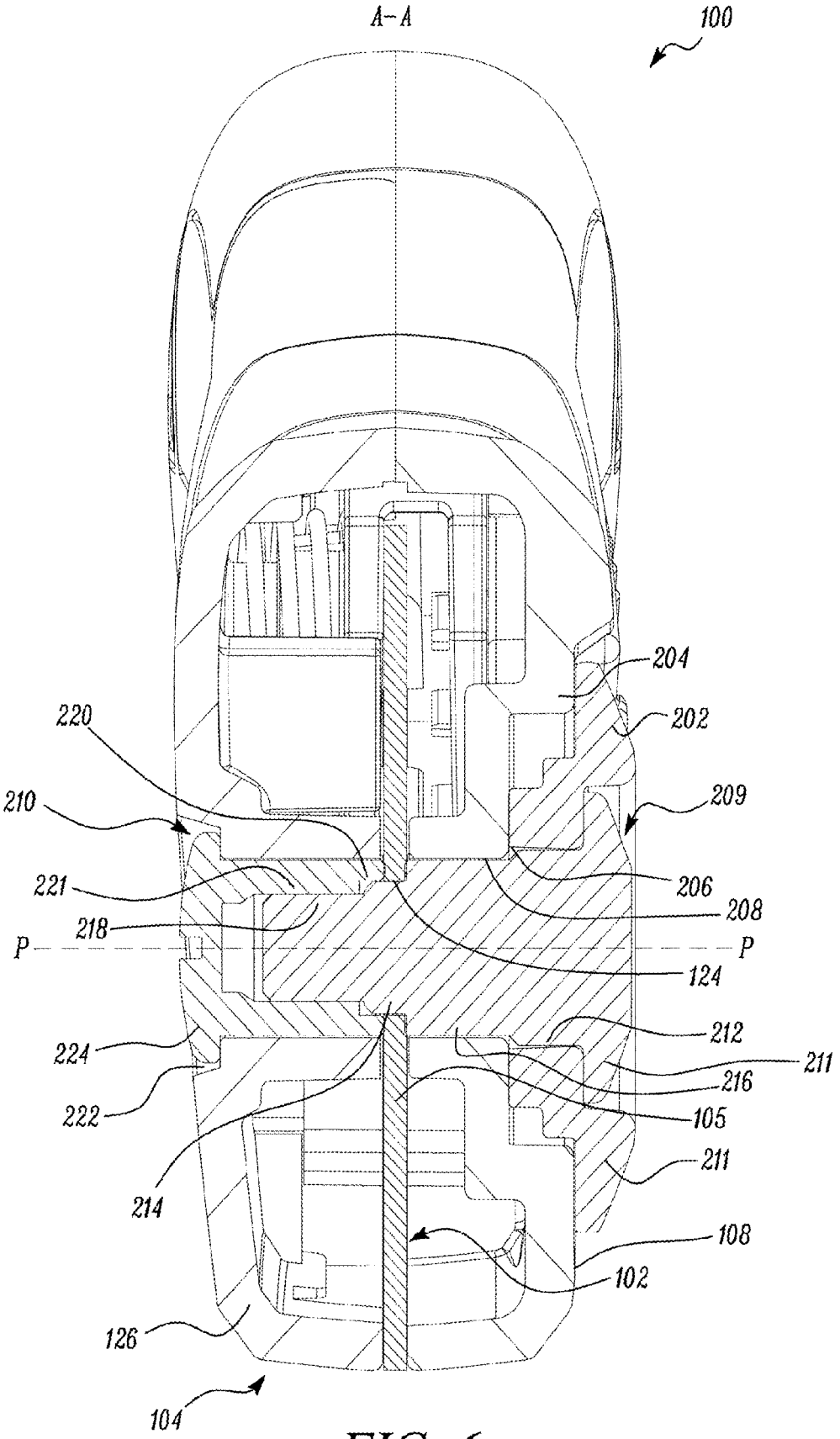
FIG. 6 illustrates a sectional view of the hand-held tool along a plane A-A in FIG. 4, according to an embodiment of the present invention.

FIG. 6 illustrates a sectional view of the tool 100. Referring to FIGS. 5 and 6, a ring member 202 is received by a recessed portion 204 of the handle 104. The ring member 202 and the recessed portion 204 include aligned holes 206 and 208, respectively. The hole 206 of the ring member 202 may be substantially non-circular, whereas the hole 208 of the recessed portion 204 may be substantially circular. A screw 209 passed through the holes 206 and 208, and engages with the aperture 124, and a bushing 210. The screw 209 includes a head 211, a first non-circular portion 212, a second non-circular portion 214, a first circular portion 216 and a second circular portion 218. A width of each of the portions of the screw may progressively decrease from the head 211 to the second circular portion 218. The first non-circular portion 212 at partly engages with the hole 206 of the ring member 202. The ring member 202 may provide support to the screw 209 to facilitate rotation of the blade 102. The engagement between the first non-circular portion 212 and the hole 206 may substantially prevent any relative rotation between the ring member 202 and the screw 209. Further, the head 211 is retained by a stepped portion 219 of the ring member 202. The first circular portion 216 at least partly engages with the hole 208 of the recessed portion 204. This may enable relative rotation between the screw 209 and the handle 104. The second non-circular portion 214 of the screw 209 at least partly engages with the aperture 124 of the blade 102. This may substantially prevent any relative rotation between the blade 102 and the screw 209. The second non-circular portion 214 of the screw 209 also engages with a first circular portion 220 of the bushing 210. A diameter of the first circular portion 220 of the bushing 210 may be large enough to enclose the second non-circular portion 214 of the screw 209. Further, the second circular portion 218 of the screw 209 engages with a second circular portion 221 of the bushing 210. In an embodiment, the first circular portion 220 of the bushing 210 may be wider than the second circular portion 221. This may provide additional support to the screw 209 to facilitate rotation of the blade 102 relative to the handle 104. Therefore, the ring member 202, the screw 209 and the bushing 210 may rotate along with the blade 102 along a pivot axis P relative to the handle 104. Further, a head 224 of the bushing 210 is retained within a hole 222 of the cover member 126. In an embodiment, a portion of one of the screw 209, the recessed portion 204, and the bushing 210 may include a low friction material. Various details of the screw 209, the ring member 202, the recessed portion 204, and the bushing 210, as described above are purely exemplary in nature, and any other type of pivot connections may be envisioned between the blade 102 and the handle 104 without deviating from the scope of the present invention. In an embodiment, two blade support members 225 are provided on both sides of the first slot 114. The blade support members 225 may provide additional support to the blade 102 so that the blade 102 may not tilt laterally.

Figure 7:
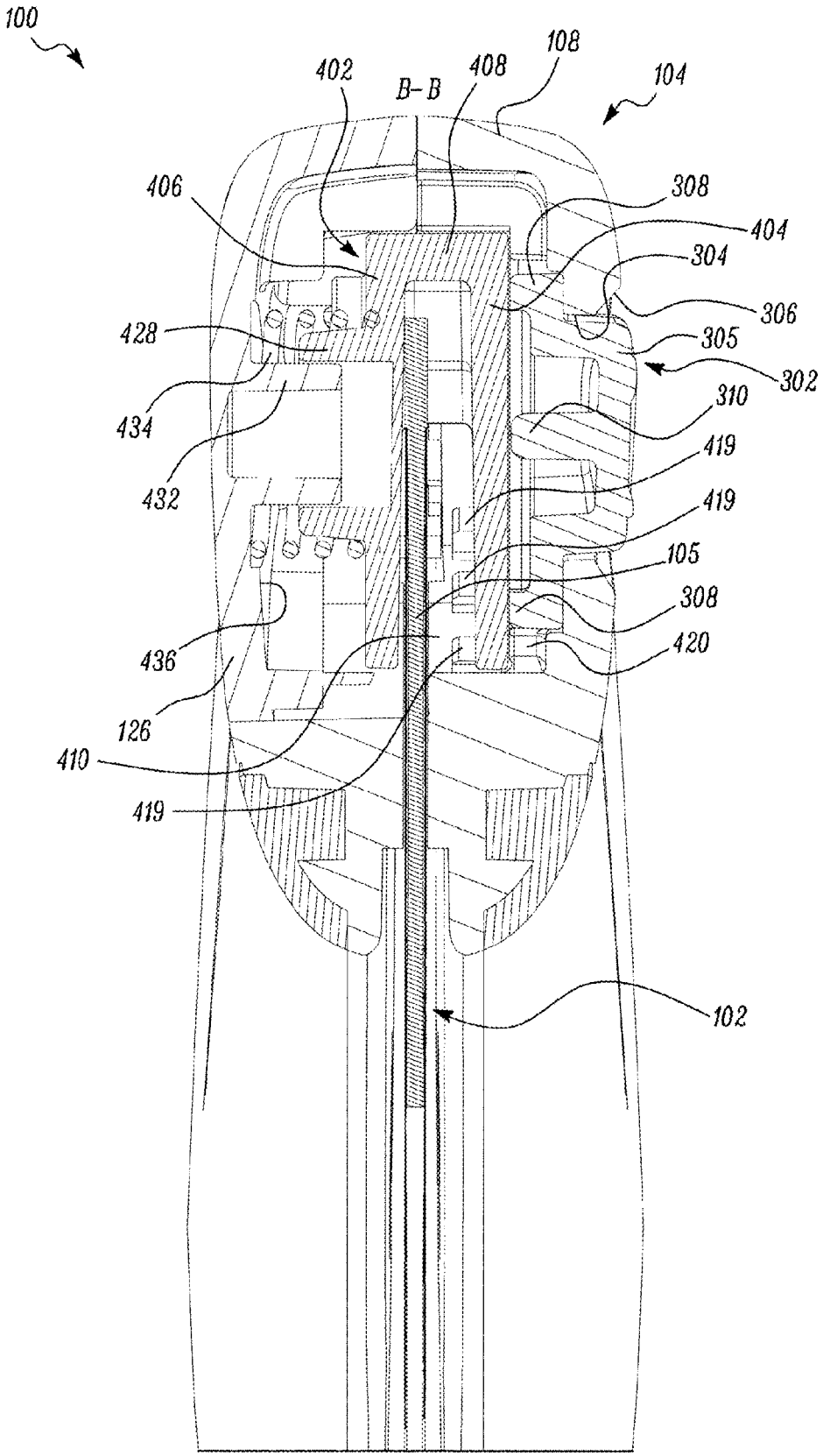
FIG. 7 illustrates a sectional view of the hand-held tool along a plane B-B in FIG. 4, according to an embodiment of the present invention.
Figure 8:
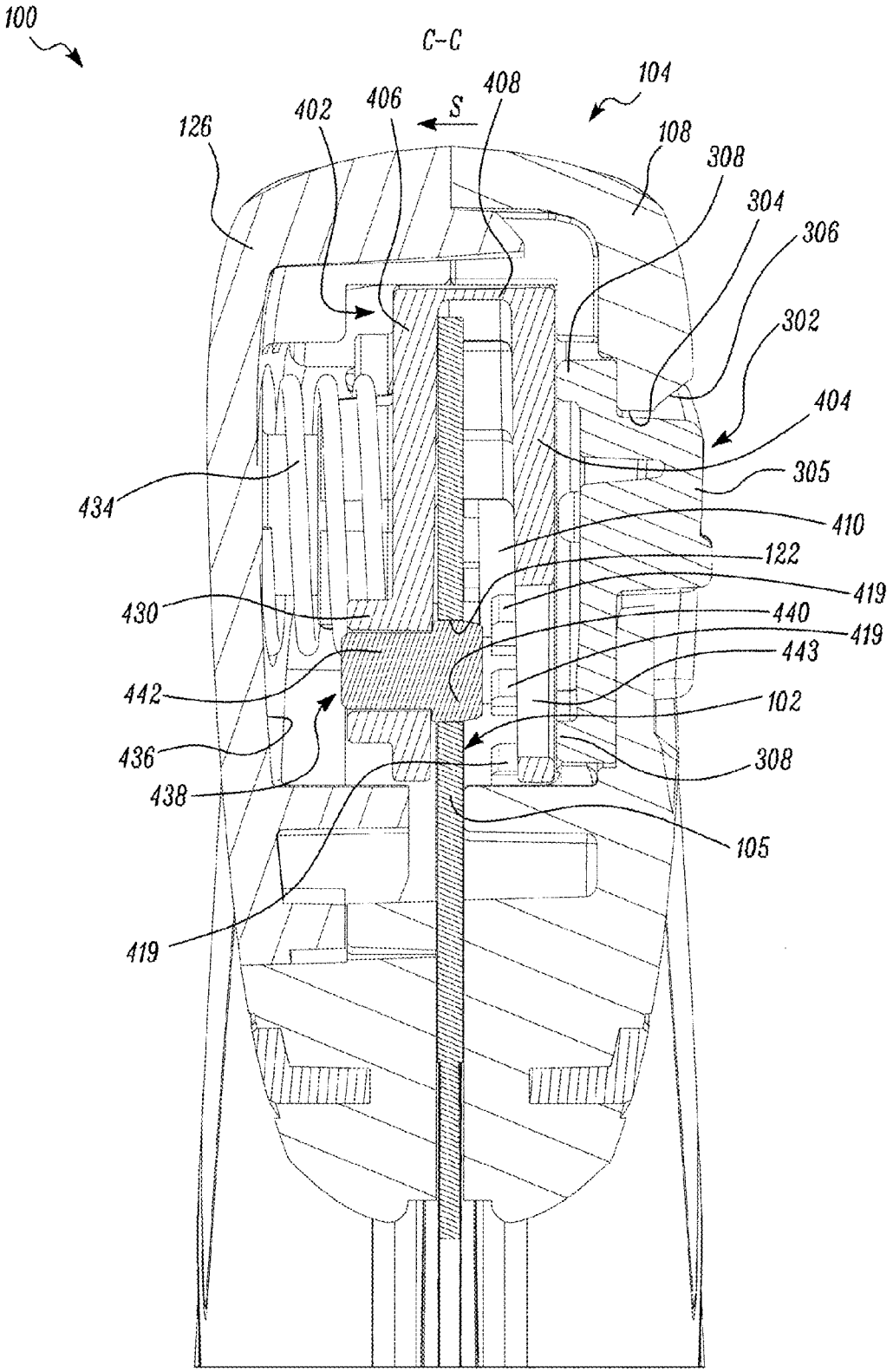
FIG. 8 illustrates a sectional view of the hand-held tool along a plane C-C in FIG. 4 with the blade retained, according to an embodiment of the present invention.
Figure 9:
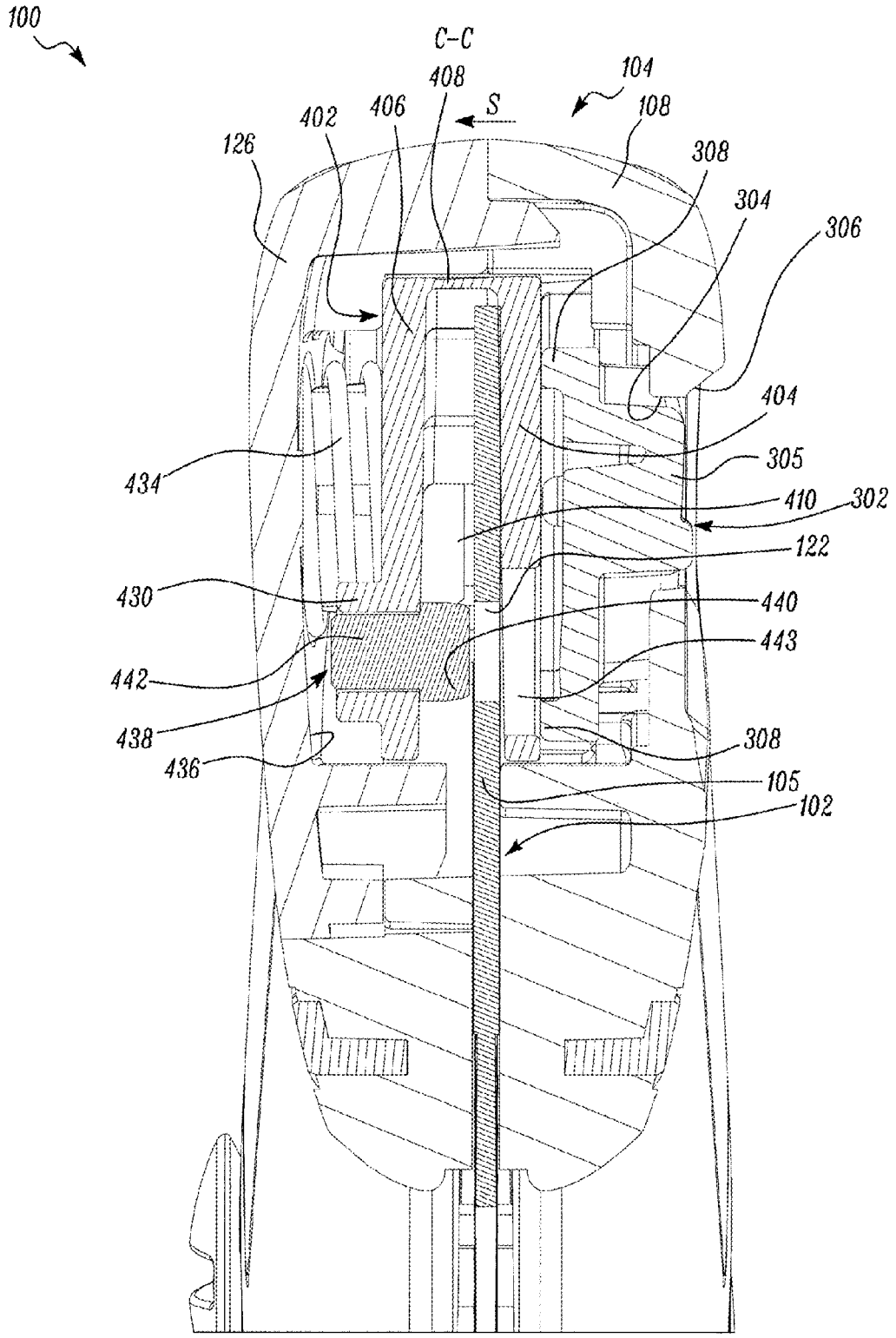
FIG. 9 illustrates a sectional view of the hand-held tool along the plane C-C with the blade free to pivot, according to an embodiment of the present invention.

FIGS. 7-9 illustrate sectional views of the tool 100 along different planes in FIG. 4. Referring to FIGS. 5 and 7, an actuating member 302 is at least partly received within an aperture 304 of the first portion 108. The aperture 304 may conform to a shape of at least a portion of the actuating member 302. The actuating member 302 may be slidable into the aperture 304. An outer portion 305 of the actuating member 302 at least partly projects from an outer surface 306 of the first portion 108. As illustrated in FIG. 1, the outer portion 305 includes grips 307.

Referring back to FIGS. 5 and 7, the actuating member 302 includes an inner boundary 308 and a central member 310 projecting from inner surface of the actuating member 302. In an embodiment, at least a portion of the actuating member 302 including the inner boundary 308 may be larger than the aperture 304 so that the actuating member 302 is retained within the first portion 108 of the handle 104. Further, a bracket member 402 is disposed adjacent to the actuating member 302 within the handle 104. The bracket member 402 includes first and second lateral portions 404, 406. The first and second lateral portions 404, 406 are connected to each other at one end by a top portion 408. The other end of each of the first and second lateral portions 404, 406 are open. Front and rear ends of the first and second lateral portions 404, 406 may also be open. Therefore, the first and second lateral portions 404, 406 define a channel 410 between them. The channel 410 is delimited by the top portion 408 at one end and is open at the other end. The channel 410 may also be open at front and rear ends. As illustrated in FIG. 7, the channel 410 at least partially encloses the proximal end 105 of the blade 102.

As illustrated in FIG. 5, each of the first and second lateral portions 404, 406 includes a horizontal bottom edge 412 and an inclined bottom edge 414 (only for the second lateral portion 406 is shown). The horizontal bottom edge 412 of at least the first lateral portion 404 may be at least partially disposed on a horizontal planar portion 416 of the first portion 108. The horizontal planar portion 416 may be located adjacent to the recessed portion 204. Further, an inclined planar portion 418 is connected to the horizontal planar portion 416. Multiple low projections 419 are provided on the inclined planar portion 418. Each of the low projections 419 is adjacent to a high projection 420. The inclined bottom edge 414 of the first lateral portion 404 may be at least partially disposed on the low projections 419. An outer surface of the first lateral projection 404 may contact the high projections 420. Further, multiple top projections 424 are disposed on the first portion 108 of the handle 104. A part of the top portion 408 of the bracket member 402 may contact the top projections 424. The cover member 126 may also include one or more projections (not shown) that may contact the top portion 408 of the bracket member 402. The top projections 424 and the low projections 419 may secure the bracket member 402 between them. The bracket member 402 may be therefore not allowed to pivot. Further, as illustrated in FIG. 7, in an embodiment, the inner boundary 308 and the central member 310 of the actuating member 302 contact the first lateral projection 404. In an alternative embodiment, only one of the inner boundary 308 and the central member 310 may contact the first lateral projection 404.

As illustrated in FIG. 5, the second lateral portion 406 includes a first coupling portion 426. The first coupling portion 426 may include a substantially circular projection configured to movably engage with a bracket support (not shown) provided on the cover member 126 of the handle 104. The bracket member 402 further includes a second coupling portion 428 and a third coupling portion 430. The second coupling portion 428 and the third coupling portion 430 may also include substantially circular apertures. Further, the second coupling portion 428 includes multiple projections 431 on an outer surface. Referring to FIG. 7, in an embodiment, the circular aperture of the second coupling portion 428 is movably coupled to a connecting portion 432 of the cover member 126. Further, a spring member 434 is at least partly disposed on the outer surface of the second coupling portion 428, and between an inner surface 436 of the cover member 126 and an outer surface of the second lateral portion 406. Ends of the spring member 434 may be connected to the second lateral portion 406 and the inner surface 436 of the cover member 126. The projections 431 (illustrated in FIG. 5) may reduce contact between the spring member 434 and the outer surface of the second coupling portion 428. This may reduce wear to the second coupling portion 428. The spring member 434 may bias the bracket member 402 and, hence the actuating member 302 in a locking position, as illustrated in FIG. 7. The high projections 420 may laterally restrict the bracket member 402 against the biasing of the spring member 434. The spring member 434 is embodied as a helical spring. However, the spring member 434 may be any resilient component known in the art, for example, a rubber member, a spring washer, or the like.

Referring to FIGS. 5, 8 and 9, a locking member 438 is attached to the third coupling portion 430 of the second lateral portion 406. The locking member 438 is embodied as a pin including a head 440 and an elongate part 442. The first lateral portion 404 includes an aperture 443 so that the elongate part 442 of the locking member 438 may be inserted into the circular aperture of the third coupling portion 430. In an alternative embodiment, the locking member 438 may be integral with the second lateral portion 406. The head 440 may retain the locking member 438 inside the circular aperture of the third coupling portion 430. As illustrated in FIG. 8, in a locking position, the head 440 at least partly engages with the aperture 122 of the blade 102 when the blade 102 is in the retracted position. In the locking position, the locking member 438 may prevent the blade 102 from pivoting relative to the handle 104 since the bracket member 402 and, hence the second lateral portion 406 may not be allowed to pivot. The blade 102 is therefore retained in the retracted position. In the lower, middle and upper working positions of the blade 102, the head 440 may engage the apertures 116, 118, and 120 (shown in FIG. 5), respectively, in order to retain the blade 102 in the respective working positions. In the locked position, the second lateral portion 406 of the bracket member 402 may be adjacent to the proximal end 105 of the blade 102.

FIG. 9 illustrates the locking member 438 in an unlocked position. As illustrated in FIG. 9, the actuating member 302 may be moved substantially along a sliding direction S. The inner boundary 308 and the central member 310 (illustrated in FIG. 7) of the actuating member 302 may press against the outer surface of the first lateral portion 404 of the bracket member 402. Consequently, the bracket member 402 also moves substantially along the sliding direction S against the biasing force of the spring member 434. The second coupling portion 428 of the bracket member 402 slides over the connecting portion 432 (illustrated in FIG. 7) of the cover member 126. The head 440 of the locking member 438 disengages from the aperture 122 of the blade 102 and the locking member 438 moves to the unlocked position. Thus, the blade 102 is free to pivot relative to the handle 104. In the unlocked position, the first lateral portion 404 of the bracket member 402 may be adjacent to the proximal end 105 of the blade 102.

In an example, if a user wants to pivot the blade 102 from the retracted position (illustrated in FIG. 4) to the middle working position (illustrated in FIG. 1), the user may press the outer portion 305 of the actuating member 302. The actuating member 302 may move along the sliding direction S and displaces the bracket member 402 in the direction S. Consequently, the locking member 438 may disengage from the aperture 122 of the blade 102. The user may then pivot the blade 102 to the middle working position and release the actuating member 302. The spring member 434 may bias the bracket member 402 such that the locking member 438 engages the aperture 118 of the blade 102. The blade 102 may be therefore retained in the middle working position. In other examples, the user may want to pivot the blade 102 from the middle working position to any other position of the blade 102. The procedure to be followed is substantially similar to the one described above.

The blade 102 may therefore be conveniently adjusted by moving the actuating member 302 along the sliding direction S, pivoting the blade 102, and then locking the blade 102 in the desired angular position. The inner boundary 308 and the central member 310 may increase an area of contact between the actuating member 302 and the bracket member 402. Further, the outer portion 305 of the actuating member 302 may also provide an increased area to push the actuating member 302. Thus, a user may have to exert lower force in order to move the bracket member 402 along the sliding direction S via the actuating member 302. The grips 307 may also facilitate manual pressing of the actuating member 302.

As illustrated in FIG. 9, the locking member 438 may be completely disengaged from the blade 102 in the unlocked position. Thus, during pivoting of the blade 102 there may not be any contact between the blade 102 and the locking member 438. This may substantially reduce wear of the various apertures 116, 118, 120 and 122 of the blade 102 and/or the locking member 438. The user may also not feel reduced resistance and therefore be required to exert lower effort while pivoting the blade 102. Further, the locking member 438 may not need any portion with a smaller width adjacent to the head 440 since the locking member 438 is completely disengaged from the blade 102 in the unlocked position. This may simplify a design and/or a manufacture of the locking member 438.

As illustrated in FIGS. 8 and 9, the locking member 438 may move substantially linearly along the sliding direction S. An angular movement of the locking member 438 may result in a smaller width of the head 440 of the locking member 438. Therefore, the complete disengagement of the locking member 438 from the blade 102 and/or the substantially linear movement of the locking member 438 may allow a width of the head 440 that is close to a width of each of the apertures 116, 118, 120 and 122 of the blade 102. Thus, a clearance between the head 440 of the locking member 438 and each of the apertures 116, 118, 120 and 122 may be minimized, resulting in a tighter engagement between the locking member 438 and the blade 102 in the locked position. Consequently, any undesired movement of the blade 102 in the locked condition may be substantially prevented.

Further, in the locked position, the first and second lateral portions 404, 406 of the bracket member 402 may be in contact with various other components, such as, the actuating member 302, the horizontal planar portion 416, the low projections 419, the high projections 420, the top projections 424, the connecting portion 432, the cover member 126 etc. This may prevent any undesired movement or pivoting of the bracket member 402. Therefore, the locking member 438, that is coupled to the bracket member 402, may be able to securely retain the blade 102. Further, the proximal end 105 of the blade 102 may be at least partially enclosed by the channel 410 between the first and second lateral portions 404, 406. The second lateral portion 406 may also partly contact the proximal end 105 of the blade 102. Thus, during an operation, forces acting on the blade 102 may be partly transmitted from the proximal end 105 to the various components in contact with the bracket member 402. Consequently, an area of dissipation of the forces is increased. The bracket member 402 may enhance force transmission from the blade 102 to the handle 104. Therefore, the forces may be dissipated without causing increased wear to the blade 102, the locking member 438, the bracket member 402, and/or various other components of the tool 100. Further, the ring member 202, the screw 209 and the bushing 210 (illustrated in FIGS. 5 and 6) may result in easy pivoting of the blade 102 with minimum lateral movement. The bracket member 402 may also minimize any lateral movement of the blade 102 during pivoting. Forces acting on the blade 102 may also be partly transmitted to the ring member 202, the screw 209 and the bushing 210, thereby reducing wear.

The handle 104 may be substantially a single component with the cover member 126. The cover member 126 may be detachable to facilitate assembly and/or maintenance of the tool 100. Single component configuration of the handle 104 may reduce any alignment errors during assembly. Manufacturing of the tool 100 may also be more cost efficient and simple. Further, the handle 104 may be compact and durable.

In the drawings and specification, there have been disclosed preferred embodiments and examples of the invention and, although specific terms are employed, they are used in a generic and descriptive sense only and not for the purpose of limitation of the scope of the invention being set forth in the following claims.

PARTS LIST

100 Hand-Held Tool
102 Blade
104 Handle
105 Proximal End of the Blade
106 Cutting Edge of the Blade
107 Eyelet of the Blade
108 First Portion of the Handle
110 Second Portion of the Handle
112 End Support of the Handle
114 First Slot of the Handle
115 Second Slot of the Handle
116 Lower Working Position Aperture
118 Middle Working Position Aperture
120 Upper Working Position Aperture
122 Retracted Position Aperture
124 Non-Circular Aperture
126 Cover Member
127 Fastener
128 Hole of the Cover Member
129 Cover Coupler
130 Latch
202 Ring Member
204 Recessed Portion
206 Hole of the Ring Member
208 Hole of the Recessed Portion
209 Screw
210 Bushing
211 Head of the Screw
212 First Non-Circular Portion of the Screw
214 Second Non-Circular Portion of the Screw
216 First Circular Portion of the Screw
218 Second Circular Portion of the Screw
219 Stepped Portion of the Ring Member
220 First Circular Portion of the Bushing
221 Second Circular Portion of the Bushing
222 Hole of the Cover Member
224 Head of the Bushing
225 Blade Support Members
302 Actuating Member
304 Aperture of the First Portion
305 Outer Portion of the Actuating Member
306 Outer Surface of the First Portion
307 Grips of the Actuating Member
308 Inner Boundary of the Actuating Member
310 Central Member of the Actuating Member
402 Bracket Member
404 First Lateral Portion of the Bracket Member
406 Second Lateral Portion of the Bracket Member
408 Top Portion of the Bracket Member
410 Channel of the Bracket Member
412 Horizontal Bottom Edge
414 Inclined Bottom Edge
416 Horizontal Planar Portion
418 Inclined Planar Portion
419 Low Projections
420 High Projections
424 Top Projections
426 First Coupling Portion of the Second Lateral Portion
428 Second Coupling Portion of the Second Lateral Portion
430 Third Coupling Portion of the Second Lateral Portion
431 Projections of the Second Coupling Portion
432 Connecting Portion of the Cover Member
434 Spring Member
436 Inner Surface of the Cover Member
438 Locking Member
440 Head of the Locking Member
442 Elongate Part of the Locking Member
443 Aperture of the First Lateral Portion
P Pivot Axis
S Sliding Direction

The invention claimed is:

1. A hand-held tool comprising:

a handle;

a blade having a proximal end pivotably coupled to the handle, the blade comprising a plurality of apertures; and a locking member configured to detachably engage with one of the plurality of the apertures to retain the blade at an angular position relative to the handle;

wherein the locking member is provided on a bracket member coupled to the handle, wherein the bracket member is configured to at least partially enclose the proximal end of the blade;

the bracket member is spring biased such that the locking member engages with one of the plurality of the apertures to retain the blade at an angular position relative to the handle; and the bracket member is movable such that the locking member disengages from one of the plurality of the apertures to allow the blade to pivot relative to the handle,

*wherein the bracket member comprises two lateral portions, each lateral portion being connected to each other at one end, wherein the two lateral portions at least partially enclose the proximal end of the blade, and*

*wherein a surface area of the two lateral portions of the bracket member facing the blade is greater that a surface area of the locking member facing the blade to dissipate forces from the blade via the bracket member.*

[2. The hand-held tool according to claim 1, wherein the bracket member comprises two lateral portions, each lateral portion being connected to each other at one end, wherein the two lateral portions at least partially enclose the proximal end of the blade.]

3. The hand-held tool according to claim 1, wherein the locking member is integral with the bracket member.

4. The hand-held tool according to claim [2] *1*, wherein the locking member is a pin coupled to one of the lateral portions.

5. The hand-held tool according to claim 1, wherein the bracket member further comprises at least one first coupling portion, the at least one first coupling portion being configured to movably engage with a bracket support of the handle.

6. The hand-held tool according to claim 1, wherein the bracket member further comprises a coupling portion, the coupling portion being configured to engage with a connecting portion of the handle.

7. The hand-held tool according to claim 6 further comprises a spring member disposed between the bracket member and the handle, the spring member configured to bias the bracket member such that the locking member engages with one of the plurality of the apertures.

8. The hand-held tool according to claim 1 further comprises an actuating member configured to move the bracket member such that the locking member disengages from one of the plurality of the apertures.

9. The hand-held tool according to claim 8, wherein the actuating member at least partly projects from an outer surface of the handle.

10. The hand-held tool according to claim 8, wherein the actuating member comprises an inner boundary and a central member, the inner boundary and/or the central member being configured to contact the bracket member.

11. The hand-held tool according to claim 1, wherein the plurality of the apertures of the blade comprises:

at least one working position aperture corresponding to a working position of the blade, the blade extending from the handle in the working position; and a refracted position aperture corresponding to a retracted position of the blade, the blade at least partially retracted within the handle in the retracted position.

12. The hand-held tool according to claim 11, wherein the handle comprises a slot configured to at least partially receive the blade in the retracted position.

13. The hand-held tool according to claim 1, wherein the blade further comprises a non-circular aperture, the non-circular aperture being configured to engage with a corresponding non-circular portion of a screw.

14. The hand-held tool according to claim 13, wherein the screw engages with a bushing, the screw and the bushing being rotatable relative to the handle.

15. The hand-held tool according to claim 1, wherein the handle further comprises a detachable cover member.

16. The hand-held tool according to claim 1 wherein the hand-held tool is one of a handsaw or a knife.

*17. A hand-held tool comprising:*

*a handle;*

*a blade having a proximal end pivotably coupled to the handle, the blade comprising a plurality of apertures; and*

*a locking member configured to detachably engage with one of the plurality of the apertures to retain the blade at an angular position relative to the handle, the locking member having a first surface area facing the blade;*

*wherein the locking member is provided inside a bracket member coupled to the handle, wherein the bracket member is configured to at least partially enclose the proximal end of the blade;*

*the bracket member is spring biased such that the locking member engages with one of the plurality of the apertures to retain the blade at an angular position relative to the handle; and*

*the bracket member is movable such that the locking member disengages from one of the plurality of the apertures to allow the blade to pivot relative to the handle,*

*wherein the bracket member comprises two lateral portions, each lateral portion being connected to each other at one end, wherein the two lateral portions at least partially enclose the proximal end of the blade and have a second surface area facing the blade, and*

*wherein the second surface area is larger than the first surface area.*

* * * * *